United States Patent
Yamamoto et al.

(10) Patent No.: US 7,896,303 B2
(45) Date of Patent: Mar. 1, 2011

(54) CONTAINER HOLDER

(75) Inventors: Aya Yamamoto, Nisshin (JP); Yasuhiro Sakakibara, Aichi-ken (JP)

(73) Assignee: Toyoda Gosei Co., Ltd., Aichi-Pref. (JP)

( * ) Notice: Subject to any disclaimer, the term of this patent is extended or adjusted under 35 U.S.C. 154(b) by 886 days.

(21) Appl. No.: 11/878,659

(22) Filed: Jul. 26, 2007

(65) Prior Publication Data

US 2008/0054006 A1    Mar. 6, 2008

(30) Foreign Application Priority Data

Aug. 30, 2006   (JP) ................. 2006-234403

(51) Int. Cl.
*A47K 1/08*   (2006.01)

(52) U.S. Cl. .............. 248/311.2; 224/281; 224/483; 224/926

(58) Field of Classification Search ............ 248/311.2; 224/281, 483, 926; 220/737
See application file for complete search history.

(56) References Cited

U.S. PATENT DOCUMENTS

| | | | |
|---|---|---|---|
| 6,622,886 B2 * | 9/2003 | Kaupp et al. | 220/737 |
| 7,568,601 B2 * | 8/2009 | Kogami et al. | 224/483 |
| 2005/0194506 A1 * | 9/2005 | Lang et al. | 248/311.2 |
| 2005/0224676 A1 * | 10/2005 | Stavermann | 248/311.2 |
| 2010/0163702 A1 * | 7/2010 | Lagobi | 248/311.2 |

FOREIGN PATENT DOCUMENTS

| | | |
|---|---|---|
| JP | A-2003-182438 | 7/2003 |
| JP | A-2005-329824 | 12/2005 |
| JP | A-2006-130968 | 5/2006 |

* cited by examiner

*Primary Examiner* — Ramon O Ramirez
(74) *Attorney, Agent, or Firm* — Posz Law Group, PLC (57) ABSTRACT

A container holder includes a holder body, a supporting member, an actuator, and a switch. The supporting member is disposed movably to the holder body. The holder body demarcates an accommodation space for accommodating or holding a container therein partially. The actuator includes a first actuating unit, being made of a ferromagnet, and a second actuating unit, being made of an electromagnet. Moreover, one of the actuator's first actuating unit and second actuating unit is fixed to the holder body, and the other one of the actuator's first actuating unit and second actuating unit is fixed to the supporting member. The switch turns on and off the actuator's second actuating unit to have the electromagnet produce and lose an electromagnetic force. The resulting electromagnetic force moves the supporting member to come in and/or come out of the holder body's accommodation space.

5 Claims, 8 Drawing Sheets

CONTAINER HOLDER

BACKGROUND OF THE INVENTION

1. Field of the Invention

The present invention relates to a container holder for accommodating or holding containers therein, containers which contain beverages.

2. Description of the Related Art

A container holder is an apparatus, which has an accommodation space for accommodating or holding containers, such as cans, plastic bottles and cups, therein, containers which hold beverages. As disclosed in Japanese Unexamined Patent Publication (KOKAI) No. 2005-329824, Japanese Unexamined Patent Publication (KOKAI) No. 2006-130968 and Japanese Unexamined Patent Publication (KOKAI) No. 2003-182438, for instance, conventional container holders have been known. Such a conventional container holder comprises a holder body, and a supporting member. The holder body demarcates at least a part of the accommodation space. The supporting member enlarges and diminishes the accommodation space diametrically.

Usually, in this type of conventional container holders, the supporting member is disposed swingably or slidably to the holder body, and at least a part of the supporting member comes in and comes out of the accommodation space, thereby enlarging and diminishing the accommodation space diametrically. Specifically, when the supporting member comes inward into the accommodation space, the inside diameter of the accommodation space reduces to the extent that the supporting member comes inward thereinto. In this instance, the conventional container holder can therefore stably accommodate or hold a container with a small outside diameter. On the other hand, when the supporting member comes outward out of the accommodation space, the inside diameter of the accommodation space increases. In this instance, the conventional container holder can therefore stably accommodate or hold a container with a large outside diameter. Thus, this type of conventional container holders can stably accommodate or hold containers with various shapes therein.

Note, however, that it has been a usual engineering practice to provide this type of conventional container holders with actuating means for moving the supporting member. For example, in the conventional container holder disclosed in Japanese Unexamined Patent Publication (KOKAI) No. 2005-329824, an electric motor, the actuating means, is used to move the supporting member, or swing it specifically. However, the conventional container holder has been associated with the problem that the manufacturing costs have gone up, because electric motors are expensive.

SUMMARY OF THE INVENTION

The present invention has been developed in view of the aforementioned circumstances. It is therefore an object of the present invention to provide a container holder, which can not only accommodate or hold containers with various shapes stably but also can be manufactured less expensively.

A container holder according to the present invention can solve the aforementioned problems, and comprises:

a holder body formed as a hollow shape which is opened upward, and demarcating at least a part of an accommodation space for accommodating or holding a container therein;

a supporting member disposed movably to the holder body, at least a part of the supporting member coming in and coming out of the accommodation space of the holder body, thereby enlarging and diminishing the accommodation space diametrically;

an actuator comprising a first actuating unit, which is made of a ferromagnet, and a second actuating unit, which is made of an electromagnet;

a switch for turning on and turning off the second actuating unit of the actuator;

one of the first actuating unit and second actuating unit of the actuator being fixed to the holder body, and the other one of the first actuating unit and second actuating unit of the actuator being fixed to the supporting member; and the second actuating unit of the actuator producing an electromagnetic force to move the first actuating unit of the actuator, thereby actuating the supporting member to diametrically diminish the accommodation space of the holder body.

The thus arranged present container holder can preferably be provided with any one of the following desirable arrangements (1), (2) and (3). Moreover, it can further preferably be provided with a plurality of the following first, second and third desirable arrangements (1), (2) and (3).

(1) In the present container holder, the holder body can preferably have a bottom disposed movably in an up/down direction, at least a part of the bottom disposed in the accommodation space of the holder body; and the switch can preferably have a movable switching unit fixed to the bottom of the holder body, and a fixed switching unit fixed to the holder body; wherein the bottom of the holder body can preferably move downward to approach the movable switching unit of the switch the fixed switching unit of the switch, thereby actuating the switch to turn on the second actuating unit of the actuator; and the bottom can preferably move upward to separate the movable switching unit of the switch from the fixed switching unit of the switch, thereby actuating the switch to turn off the second actuating unit of the actuator.

(2) When the present container is provided with the first desirable arrangement as described above, one of the movable switching unit and fixed switching unit of the switch can preferably comprise a magnet; and the other one of the movable switching unit and fixed switching unit of the switch can preferably comprise a Hall-effect switch having a Hall element, the Hall-effect switch actuating the switch to turn on the second actuating unit of the actuator when the magnet approaches the Hall element.

(3) The present container holder can preferably further comprise a spacer being fixed to one of the holder body and the supporting member, wherein: the supporting member can preferably have a swingable supporter disposed swingably to the holder body, and an arm, one of the opposite ends of the arm fixed to the swingable supporter and the other one of the opposite ends extending in a radial direction of the swingable supporter, and thereby the supporting member swings about the swingable supporter to diametrically enlarge and diminish the accommodation space of the holder body; the first actuating unit of the actuator can preferably be fixed to the supporting member; the second actuating unit of the actuator can preferably be fixed to the holder body, and can preferably have an electric power source and a coil, which make the electromagnet; the spacer can preferably be disposed on an opposite side with respect to the first actuating unit of the actuator with the coil of the second actuating unit of the actuator interposed therebetween; and the first actuating unit, the coil of the second actuating unit, and the spacer can preferably be disposed on an identical imaginary arc. In this instance, the spacer can further preferably be made of a paramagnet. In the present specification, the term, "paramagnet,"

is a concept that involves those other than ferromagnetism, the property of a material in which the internal magnetic moments spontaneously organize in a common direction, and which gives rise to a permeability considerable greater than that of vacuum, and to magnetic hysteresis. Specifically, in the present specification, a "paramagnet" includes: nonmagnetic substances that are not magnetizable and therefore not affected by magnetic fields; paramagnetic substances that, placed in a magnetic field, possess magnetization in direct proportion to the field strength, or in which the magnetic moments of the atoms are not aligned; antiferromagnetic substances in which the atomic magnetic moments form an ordered array which alternates or spirals so as to give no net total in zero applied magnetic field; and diamagnetic substances that are repelled by magnets.

The present container holder comprises the holder body, the supporting member, the actuator, and the switch. The holder body has the accommodation space for accommodating or holding a container therein. The supporting member is disposed movably to the holder body. At least a part of the supporting member comes in and comes out of the accommodation space of the holder body, thereby enlarging and diminishing the accommodation space diametrically. The actuator comprises a first actuating unit, and a second actuator unit. The first actuating unit is made of a ferromagnet. The second actuating unit is made of an electromagnet. The switch turns on and turns off the second actuating unit of the actuator. Note that, in the present container holder, the first actuating unit of the actuator, first actuating unit which is made of a ferromagnet, can be magnetized, or cannot be magnetized. In other words, the first actuating unit can comprise a magnet, or can comprise a nonmagnetic substance.

When the present container holder comprises the first actuating unit, being made of a ferromagnet which is not magnetized, the present container holder operates as described below.

When the switch turns on the second actuating unit of the actuator, an electromagnetic force arises around the electromagnet of the second actuating unit. Accordingly, the second actuating unit of the actuator attracts the first actuating unit of the actuator, first actuating unit which is made of a ferromagnet. Since one of the first actuating unit and second actuating unit of the actuator is fixed to the holder body and the other one of the first actuating unit and second actuating unit of the actuator is fixed to the supporting member, the supporting member moves toward the holder body when the second actuating unit attracts the first actuating unit. Then, at least a part of the thus moving supporting member comes inward into the accommodation space. Consequently, the accommodation space diminishes diametrically to the extent that the supporting member comes inward into the accommodation space. Thus, the present container holder can accommodate or hold a container with a small outside diameter stably in the accommodation space. Specifically, under the circumstances, the distance between a part of the holder body (hereinafter referred to as a "holder body's side," if necessary), which demarcates one of the sides of the accommodation space, and the supporting member narrows down. As a result, the holder body's side and the supporting member can hold or support an outer peripheral surface of the small-outside-diameter container stably.

On the other hand, when the switch turns off the second actuating unit of the actuator, the electromagnetic force disappears around the electromagnet of the second actuating unit. Accordingly, the second actuating unit of the actuator can now hardly attract the first actuating unit of the actuator. Consequently, the supporting member can move in such a direction that the distance between the holder body's side and the supporting member widens. Therefore, the present container holder can accommodate or hold a container with a large outside diameter stably in the accommodation space.

Moreover, when the present container holder comprises the first actuating unit, being made of a ferromagnet which is magnetized, the first actuating unit of the actuator repels the electromagnet of the second actuating unit of the actuator, electromagnet around which a repelling electromagnetic force arises, or attracts the electromagnet of the second actuating unit of the actuator, electromagnet around which an attracting electromagnetic force arises. In this instance, therefore, the resulting repelling electromagnetic force around the electromagnet of the second actuating unit, repelling electromagnetic force which repels the first actuating unit, or the resulting attracting electromagnetic force around the electromagnet of the second actuating unit, attracting electromagnetic force which attracts the first actuating unit, actuates the supporting member so that the supporting member moves in such a direction that the distance between the holder body's side and the supporting member reduces. Thus, when the switch turns on the second actuating unit of the actuator, the accommodation space diminishes diametrically so that the present container holder can accommodate or hold a container with a small outside diameter stably in the accommodation space. On the other hand, when the switch turns off the second actuating unit of the actuator, the accommodation space can enlarge diametrically so that the present container holder can accommodate or hold a container with a large outside diameter stably in the accommodation space.

As described above, the present container holder can move the supporting member with an electromagnetic force, which arises in the second actuating unit of the actuator, that is, around the electromagnet of the second actuating unit. Hence, the present container holder does not require such an expensive device as electric motors at all. To put it differently, not only the present container holder can accommodate or hold containers with various shapes stably without using an electric motor, but also it can be manufactured less expensively.

In the present container holder which is provided with the first desirable arrangement (1), the holder body has a bottom. The bottom is disposed movably in an up/down direction, and at least a part of the bottom is disposed in the accommodation space. Moreover, in the present container holder which is provided with the first desirable arrangement (1), the switch has a movable switching unit and a fixed switching unit. The movable switching unit is fixed to the bottom of the holder body, and the fixed switching unit is fixed to the holder body. Since the bottom of the holder body is disposed movably in an up/down direction, and since at least a part of the bottom is disposed in the accommodation space, the bottom can move downward when a user accommodates or holds a container in the accommodation space. The downwardly moving bottom makes the movable switching unit approach the fixed switching unit. Accordingly, the switch turns on the second actuating unit of the actuator. On the other hand, when a user removes the container from out of the accommodation space, the bottom moves upward to separate the movable switching unit from the fixed switching unit. Consequently, the switch turns off the second actuating unit of the actuator. Therefore, in the present container holder which is provided with the first desirable arrangement (1), it is possible for a user to actuate the supporting member by simply putting a container into or taking it out of the accommodation space. Thus, the present container holder which is provided with the first desirable arrangement (1) does not at all require a user to carry out the complicated operations for actuating the supporting member.

In the present container holder which is provided with the second desirable arrangement (2), one of the movable switching unit and fixed switching unit of the switch comprises a magnet, and the other one of the movable switching unit and fixed switching unit of the switch comprises a Hall-effect switch. Due to the galvanomagnetic effect (or the Hall effect), a Hall element, which makes the Hall-effect switch, outputs an electric current when it is placed in a magnetic field with a predetermined strength or more. The Hall-effect switch utilizes the action of a Hall element to turn on the second actuating unit of the actuator, when it approaches the magnet, or vise versa. Moreover, the Hall-effect switch utilizes the action of a Hall element to turn off the second actuating unit of the actuator, when it gets away from the magnet, or vise versa. Accordingly, in the present container holder which is provided with the second desirable arrangement (2) in which the switch comprises the thus combined magnet and Hall-effect switch, the movable switching unit and the fixed switching unit do not necessarily contact with each other. Consequently, it is not required at all to dispose the movable switching unit and the fixed switching unit highly accurately. Therefore, the present container holder which is provided with the second desirable arrangement (2) can be manufactured much less expensively.

In the present container holder which is provided with the third desirable arrangement (3), it is possible to make the space smaller, space which is needed for disposing the supporting member, the actuator and the spacer. As a result, the present container holder which is provided with the third desirable arrangement (3) can not only be manufactured less expensively, can but also be suitably disposed in a limited space such as within automotive passenger rooms. Moreover, since the present container holder which is provided with the third desirable arrangement (3) further comprises the spacer being disposed as described above, it is possible to operate the supporting member with enhanced reliability.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

EXAMPLES

The present container holder will be hereinafter described with reference to specific examples.

Example No. 1

Figure 1:
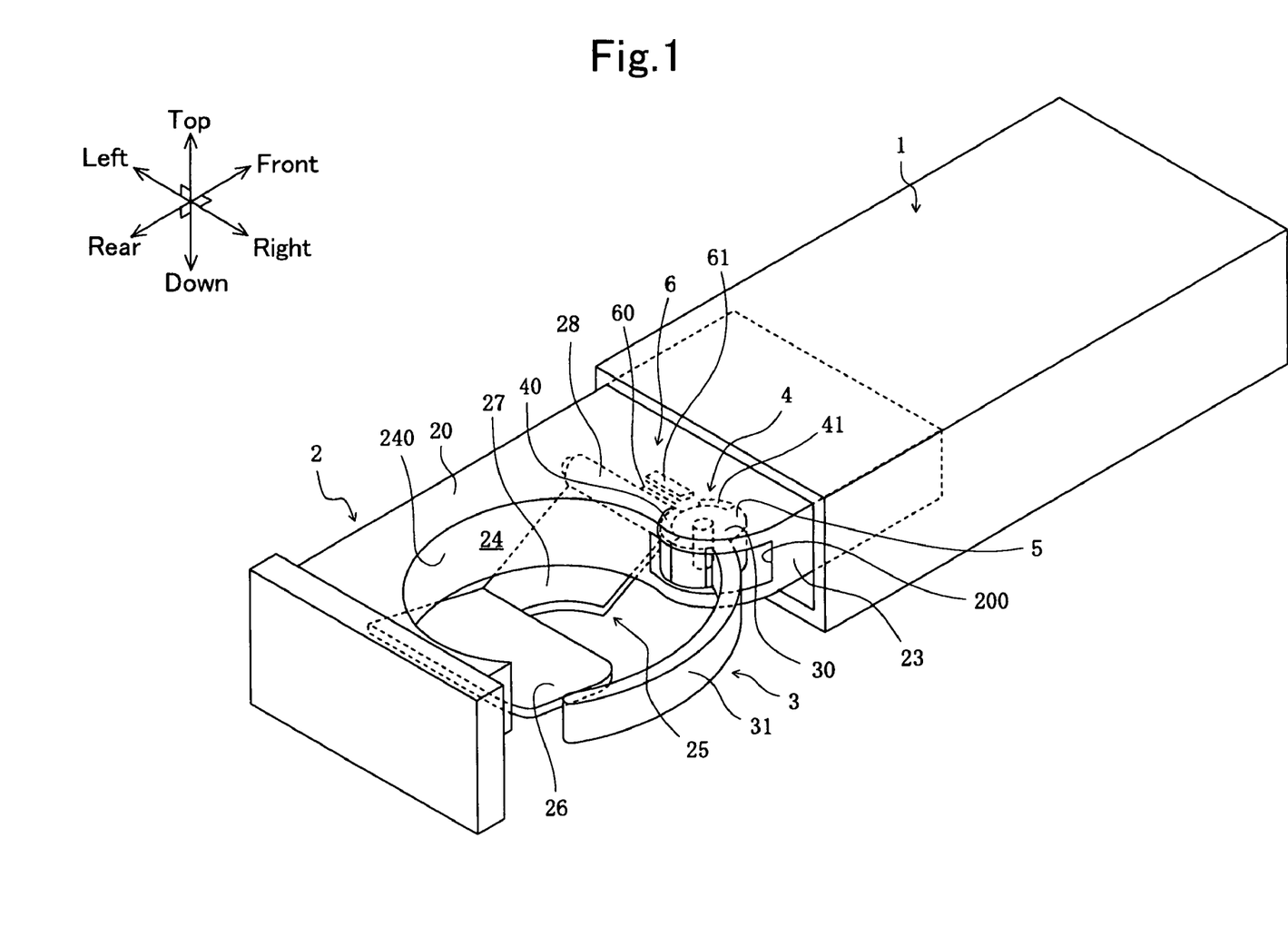
FIG. 1 is a perspective diagram for schematically illustrating a container holder according to Example No. 1 of the present invention.
Figure 2:
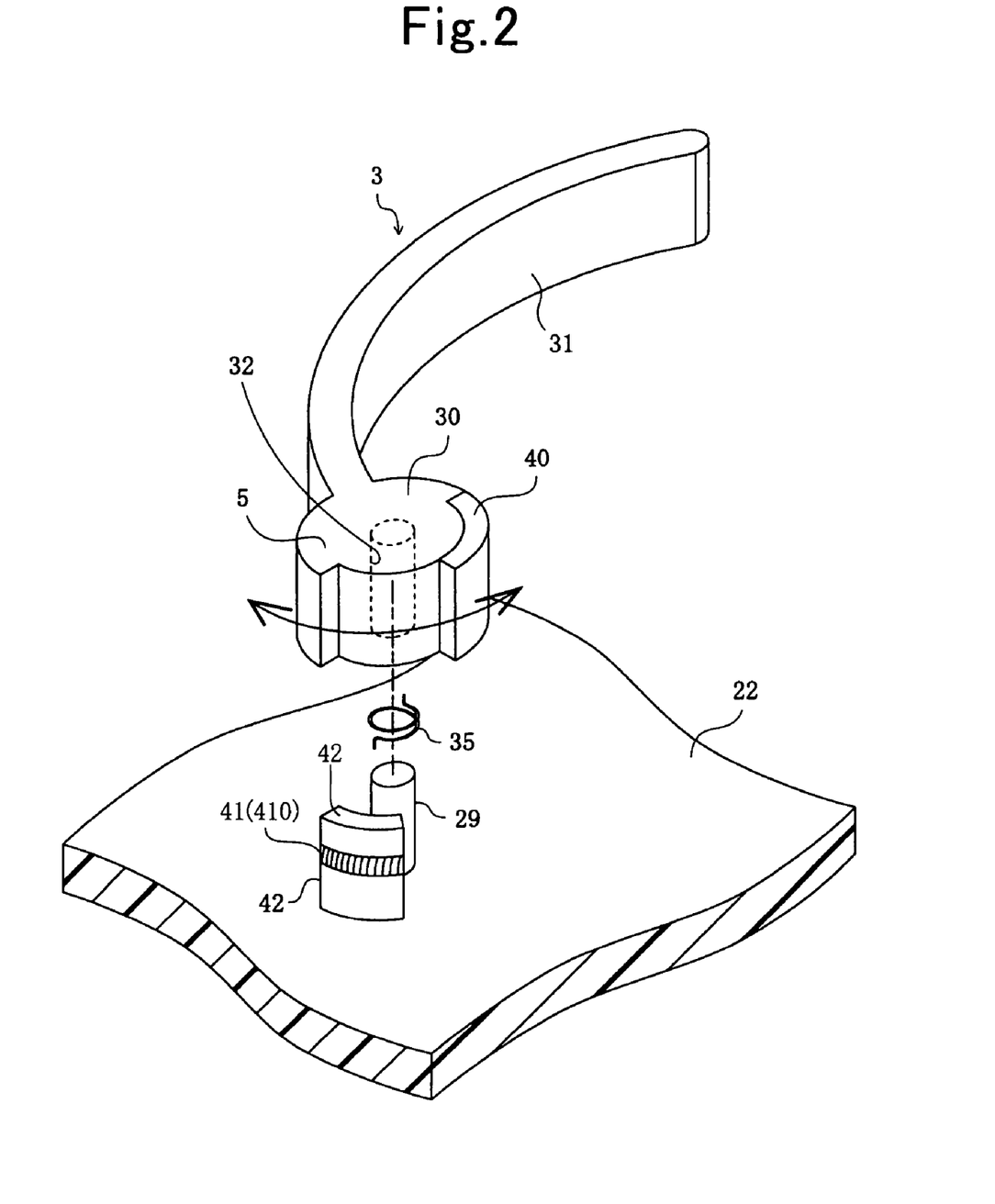
FIG. 2 is a perspective diagram for schematically illustrating how a supporting member and an actuator, which make the container holder according to Example No. 1, appear when being viewed on the front side in FIG. 1.
Figure 3:
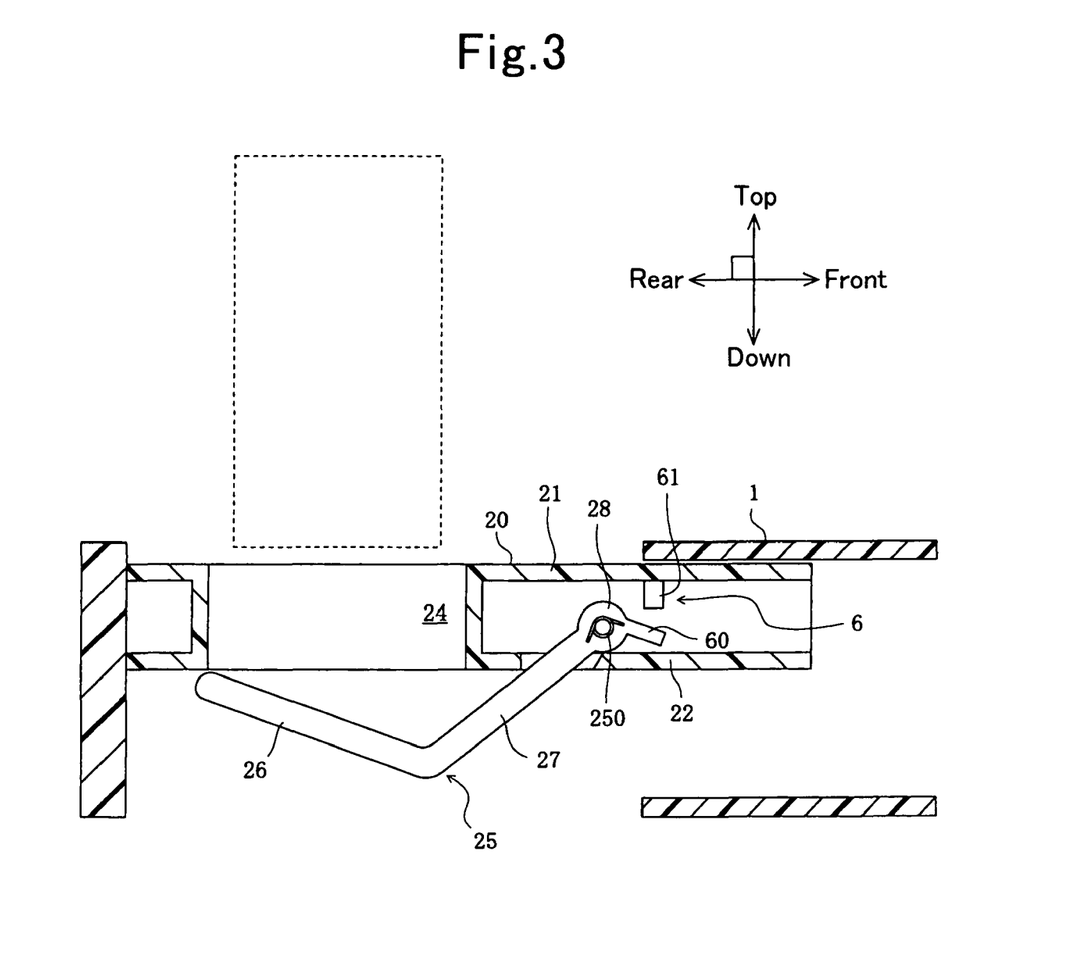
FIG. 3 is a cross-sectional diagram for schematically illustrating how a bottom, which makes the container holder according to Example No. 1, operates.
Figure 4:
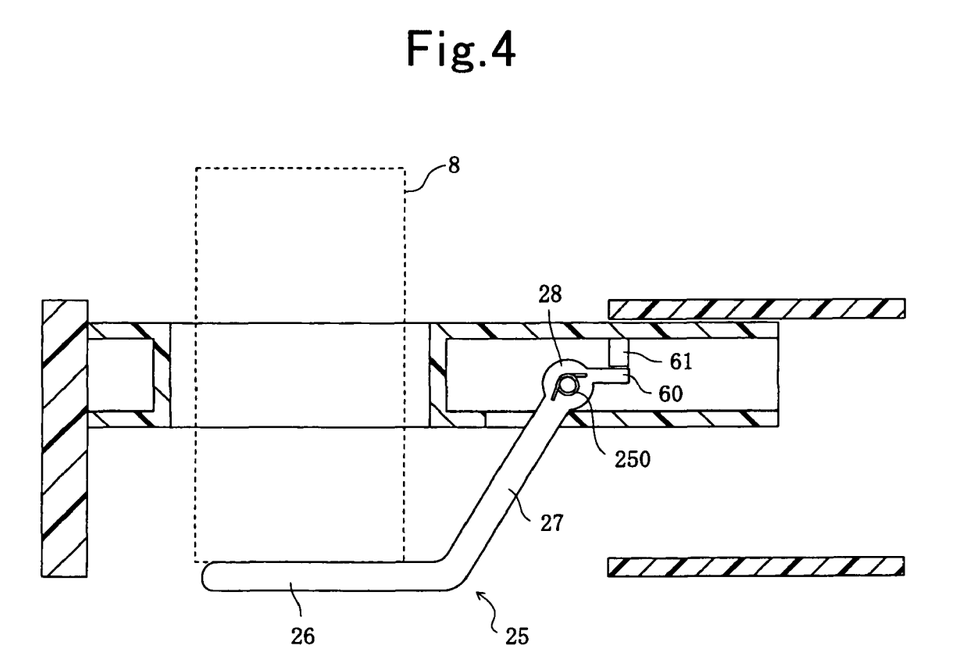
FIG. 4 is another cross-sectional diagram for schematically illustrating how the bottom, which makes the container holder according to Example No. 1, operates.
Figure 5:
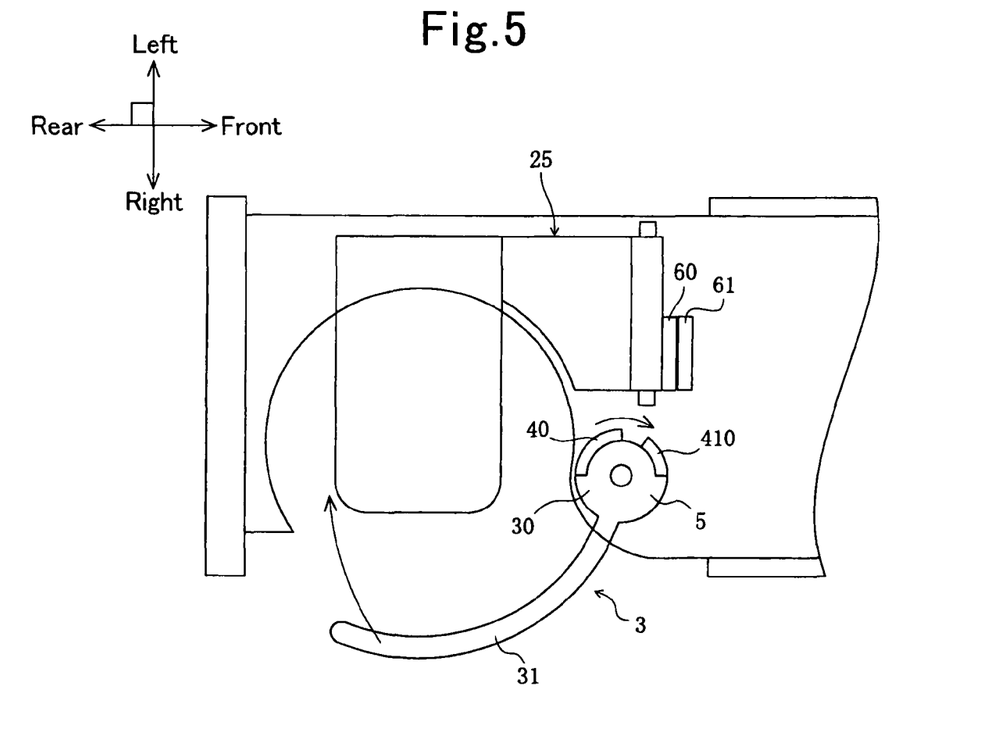
FIG. 5 is an explanatory diagram for schematically illustrating how the container holder according to Example No. 1 operates.
Figure 6:
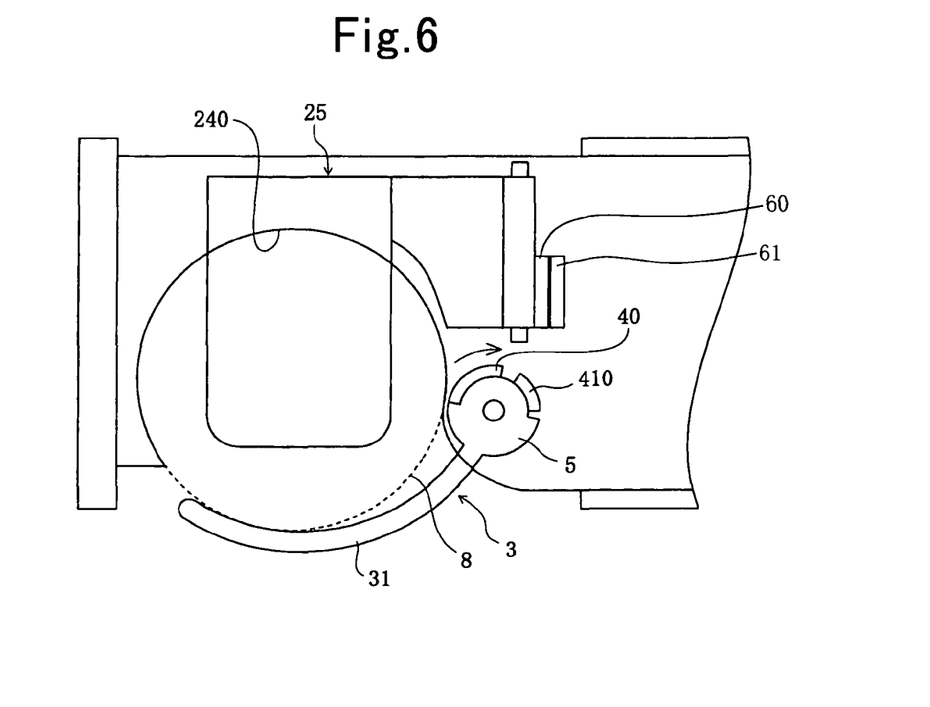
FIG. 6 is another explanatory diagram for schematically illustrating how the container holder according to Example No. 1 operates.
Figure 7:
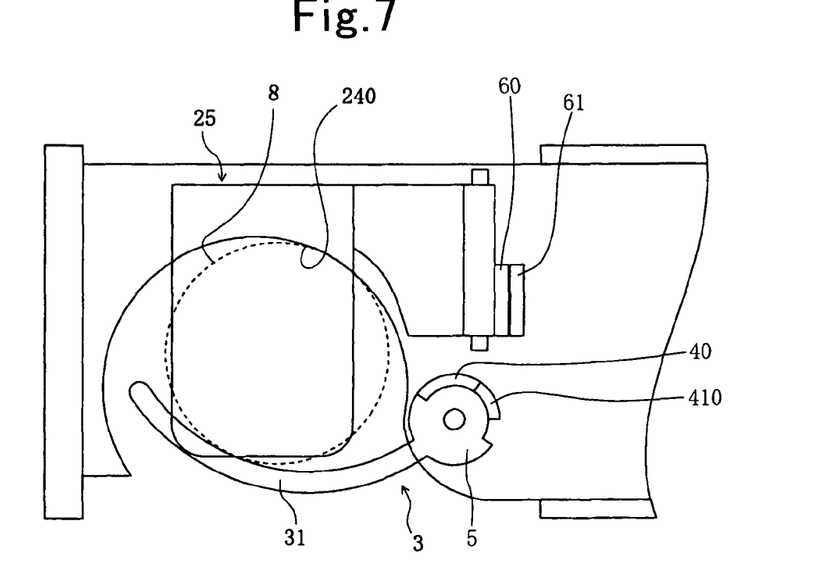
FIG. 7 is still another explanatory diagram for schematically illustrating how the container holder according to Example No. 1 operates.
Figure 8:
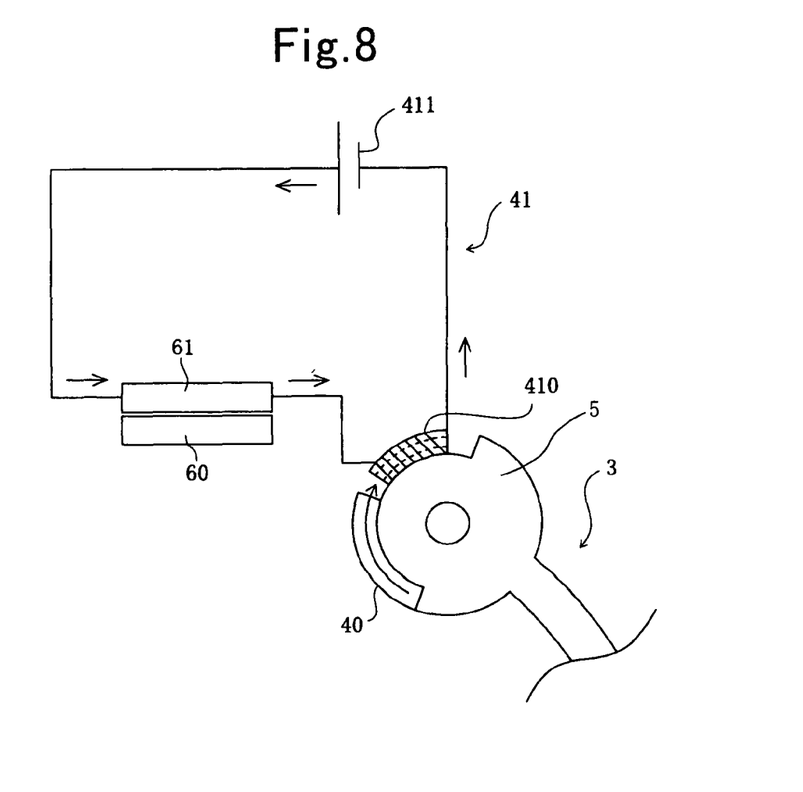
FIG. 8 is an explanatory diagram for schematically illustrating how a switch, the actuator, the supporting member and a spacer, which make the container holder according to Example No. 1, operate.

A container holder according to Example No. 1 of the present invention is an on-vehicle container holder, and is attached to an automotive instrument panel. FIG. 1 schematically illustrates the container holder according to Example No. 1 in a perspective diagram. FIG. 2 schematically illustrates the appearance of a supporting member and an actuator, which make the container holder according to Example No. 1, in a perspective diagram when they are viewed on the front side in FIG. 1. FIGS. 3 and 4 schematically illustrate how a bottom operates, bottom which makes the container holder according to Example No. 1, in a cross-sectional diagram, respectively. FIGS. 5 through 7 schematically illustrate the operations of the container holder according to Example No. 1 in an explanatory diagram, respectively. FIG. 8 schematically illustrates the operations of the switch, actuator, supporting member and spacer, which make the container holder according to Example No. 1, in an explanatory diagram. Note that, in the following descriptions on the container holder according to Example No. 1, the terms, "up," "down," "right," "left," "front" and "rear," specify those "up," "down," "right," "left," "front" and "rear" designated in FIGS. 1, 3 and 5.

As illustrated in FIG. 1, the cup holder according to Example No. 1 of the present invention comprises a casing 1, a holder body 2, a supporting member 3, an actuator 4, a spacer 5, and a switch 6.

The casing 1 is formed as a box shape substantially. The casing 1 is buried in an automotive instrument panel, and is opened to the rear side (or the passenger-room side). The casing 1's inner right and left wall surfaces are provided with a not-shown slide groove, which extends in the front/rear direction, respectively.

The holder body 2 comprises a main holder unit 20, and a bottom 25. The bottom 25 is supported swingably to the main holder unit 20. The main holder unit 20 is formed as a flattened box shape, which is provided with an inner hollow space. Moreover, the main holder unit 20 has an upper plate 21 (see FIG. 3), a lower plate 22 (see FIG. 3), and paired right and left side plates 23, 23 (see FIG. 1). The upper plate 21, lower plate 22 and paired right and left side plates 23, 23 demarcate the inner hollow space of the main holder unit 20. In addition, as can be seen from FIGS. 1, 3 and 4, the main holder unit 20 is provided with a cut-off opening 24, which is opened upward, downward and rightward. Note that the main holder unit 20's right and left side plates 23 are provided with a not-shown slide rail, which extends in the front/rear direction, respectively. The main holder unit 20's slide rails engage slidably with the casing 1's slide grooves. The slidable engagement between the slide rails and the slide grooves makes the holder body 2 movable slidably between an in-service position and a not-shown accommodated position. As shown in FIG. 1, the holder body 2 is exposed in the rear of the casing 1 at the in-service position. On the other hand, the holder body 2 is accommodated in the casing 1 at the accommodated position.

As illustrated in FIG. 1, the bottom 25 has a bottom receiver 26, a connector 27, and a bottom swingably-supporting shaft 28. The bottom receiver 26 is formed as a plate shape substantially. The connector 27 is formed as a plate shape, whose right/left-wise width is smaller than that of the bottom receiver 26, substantially. The connector 27 extends from the bottom swingably-supporting shaft 28 in such a direction that it crosses the bottom receiver 26, and is connected with the bottom swingably-supporting shaft 28 on one of the opposite end sides, which faces the swingably-supporting shaft 28. The connector 27 is provided with a substantially-sector-shaped cut-off at one of the opposite end sides, which faces the side of the bottom receiver 26. Moreover, the connector 27 is fastened to the bottom swingably-supporting shaft 28 at the other one of the opposite end sides, which is disposed oppositely to the bottom receiver 26. The bottom swingably-supporting shaft 28 is formed as a shaft shape, which extends in the right/left direction. The bottom swingably-supporting shaft 28 is supported swingably to the main holder unit 20's left side plate 23 and a not-shown rib, which protrudes from the main holder unit 20's lower plate 22 into the main holder unit 20's inner hollow space. Thus, the main holder unit 20's bottom 25 swings about the bottom swingably-supporting shaft 28 so that the bottom 25 moves between a non-holding position illustrated FIG. 3 and a holding position illustrated in FIG. 4. Specifically, as shown in FIG. 3, the bottom 25's bottom receiver 26 is disposed upward obliquely at the non-holding position. On the other hand, as shown in FIG. 4, the bottom 25's bottom receiver 26 is disposed downward horizontally at the holding position. When the bottom 25 swings, the bottom receiver 26 moves up and down, or vice versa. Note that, as shown in FIGS. 3 and 4, a bottom urging member 250 urges the main holder unit 2's bottom 25 toward the non-holding position. The bottom urging member 250 can be made of a coil spring, for instance. The bottom urging member 250 is fastened to the bottom 25's bottom swingably-supporting shaft 28 at one of the opposite ends, and is fastened to the not-shown rib at the other one of the opposite ends.

In the container holder according to Example No. 1 of the present invention, a peripheral wall 240 of the opening 24, which is formed in the holder body 2's main holder unit 20, demarcates an accommodation space partially in the peripheral direction as best shown in FIG. 1. In other words, in the container holder according to Example No. 1, the peripheral wall 240 makes the above-described holder body 2's side. Moreover, the resulting accommodation space extends in the up/down direction beyond the main holder unit 20 as illustrated in FIGS. 3 and 4. Therefore, as shown in FIGS. 3 and 4, the holder body 2's bottom 25 is disposed downward below the main holder unit 20.

As illustrated in FIG. 2, the supporting member 3 has a swingable supporter 30, and an arm 31. The swingable supporter 30 is made from resin, and is formed as a cylindrical shape, which extends in the up/down direction, substantially. Moreover, the swingable supporter 30 is disposed in the main holder unit 20's inner hollow space as best shown in FIG. 1. The arm 31 is also made from resin, and extends like an arc substantially. One of the opposite ends of the arm 31 is integrated with an outer peripheral surface of the swingable supporter 30. The other one of the opposite ends of the arm 31, the free end of the arm 31, extends from the outer peripheral surface of the swingable supporter 30 to the outside of the main holder unit 20 by way of the main holder unit 20's inner hollow space. Moreover, as illustrated in FIG. 2, an inner swingably-supporting shaft 29 for swingably supporting the supporting member 3 is disposed in the main holder unit 20's inner hollow space. Specifically, the main holder unit 20's lower plate 22 is provided with the inner swingably-supporting shaft 29, which is formed as a shaft extending upward from the lower plate 22. The supporting member 3's swingable supporter 30 is provided with a through-holed swingably-supported axis 32. The inner swingably-supporting shaft 29 is fitted into the through-holed swingably-supported axis 32. Accordingly, the supporting member 3's swingable supporter 30 is supported swingably to the holder body 2 by way of the inner swingably-supporting shaft 29. Moreover, of the opening 24's peripheral wall, a part, which faces an outer periphery of the supporting member 3's swingable supporter 30, is provided with a window-shaped communicator opening 200 as illustrated in FIG. 1. Consequently, the supporting member 3's arm 31 protrudes into the outside of the main holder unit 20 through the a window-shaped communicator opening 200.

Thus, the supporting member 3 swings between a retreated position and a supporting position about the swingable supporter 30. Specifically, at the supporting position, the supporting member 3's arm 31 comes inward into the accommodation space, that is, the arm 31 swings leftward in FIG. 1. On the other hand, at the retreated position, the supporting member 3's arm 31 comes outward out of the accommodation space, that is, the arm 31 swings rightward in FIG. 1. When the supporting member 3 is located at the supporting position, the accommodation space diminishes diametrically to the extent that the arm 31 comes inward into the accommodation space. On the contrary, when the supporting member 3 is located at the retreated position, the accommodation space enlarges diametrically to the extent that the arm 31 comes outward out of the accommodation space. Note that, as shown in FIG. 2, an urging member 35 for urging the supporting member 3 interposes between the supporting member 3's swingable supporter 30 and the main holder unit 20's inner swingably-supporting shaft 29. The urging member 35 urges the supporting member 3 toward the retreated position. The urging member 35 can be made of a coil spring, for instance.

As illustrated in FIG. 1, the actuator 4 comprises a first actuating unit 40, and a second actuating unit 41. Moreover, as illustrated in FIG. 2, the actuator 4 further comprises paired retaining units 42, 42 for retaining the second actuating unit 41 therebetween. For example, the first actuating unit 40 is made of iron, a ferromagnet. As shown in FIG. 2, the first actuating unit 40 is formed as a pillar shape whose cross section has a letter-"C" shape substantially. The first actuating unit 40 is disposed so that the inside of the letter-"C"-shaped cross section faces the supporting member 3's swingable supporter 30, and is integrated with the outer periphery of the swingable supporter 30. Accordingly, the actuator 4's first actuating unit 40 swings together with the supporting member 3. On the other hand, the second actuating unit 41 is made of an electromagnet, for instance. As shown in FIG. 2, the second actuating unit 41 has a coil 410, and an electric power source 411 (see FIG. 8). The coil 410 is made by winding an iron wire around an iron core. The coil 410 is connected electrically with the electric power source 411 as illustrated in FIG. 8. The paired retaining units 42, 42 are made from resin, and are formed as a pillar shape, whose cross section has a letter-"C" shape substantially, respectively. As shown in FIG. 2, one of the paired retaining units 42, 42 extends upward from the main holder unit 20's lower plate 22 in the same manner as the inner swingably-supporting shaft 29, and the other one of the paired retaining units 42, 42 extends upward from the second actuating unit 41's coil 410. Moreover, the paired retaining units 42, 42 are disposed around the inner swingably-supported shaft 29 so that the inside of the letter-"C"-shaped cross section faces an outer peripheral surface of the inner swingably-supported shaft 29. Specifically, the paired retaining members 42, 42 are placed on more outer peripheral side than the supporting member 3's swingable supporter 30, which is supported swingably to the inner swingably-supporting shaft 29, is placed. In addition, the second actuating unit 41's coil 410 is sandwiched between the paired retaining units 42, 42, and is extended as an arc shape, which arcs in the same manner as the paired retaining units 42, 42.

The spacer 5 is made of resin, which exhibits paramagnetism, for instance. As illustrated in FIGS. 1 and 2, the spacer 5 is formed as a pillar shape whose cross section has a letter-"C" shape substantially. Moreover, the spacer 5 is disposed so that the inside of the letter-"C"-shaped cross section faces the supporting member 3's swingable supporter 30, and is integrated with the outer periphery of the swingable supporter 30. In addition, as best shown in FIG. 2, the spacer 5 is disposed on the opposite side with respect to the actuating unit 4's first actuating unit 40 about the main holder unit 20's inner swingably-supporting shaft 29. Note that the actuator 4's second actuating unit 41 (that is, the second actuating unit 41's coil 410) is interposed between the actuator 4's first actuating unit 40 and the spacer 5. Thus, the first actuating unit 40, the second actuating unit 41, and the spacer 5 are disposed on an identical imaginary arc. Moreover, the first actuating unit 40 and the spacer 5 are disposed so that a clearance is provided therebetween. The clearance, which is provided between the first actuating unit 40 and the spacer 5, exhibits an arc length, which is greater than the coil 410's arc length or the arc length of the paired retaining members 42, 42 is.

As illustrated in FIG. 3, the switch 6 comprises a movable switching unit 60, and a fixed switching unit 61. The movable switching unit 60 is made of a magnet, for instance, and is fastened to the bottom 25's bottom swingably-supporting shaft 28. Specifically, the movable switching unit 60 is fastened to a front-side outer peripheral surface of the bottom swingably-supporting shaft 28. The fixed switching unit 61 comprises a Hall-effect switch, and is disposed in the main holder unit 20's inner hollow. Specifically, the fixed switching unit 61 is fastened to and downward from the main holder unit 20's upper plate 21, and is placed above the movable switching unit 61. As can be seen from FIG. 3, the fixed switching unit 61 is separated from the movable switching unit 60 greatly when the holder body 2's bottom 25 is placed at the non-holding position. In this instance, the fixed switching unit 61 turns off the electric connection between the second actuating unit 41's coil 410 and electric power source 411. Then, as illustrated in FIG. 4, the movable switching unit 60 approaches the fixed switching unit 61 when the holder body 2's bottom 25 moves downward to the holding position. On this occasion, the fixed switching unit 61 turns on the electric connection between the second actuating unit 41's coil 410 and electric power source 411.

The container holder according to Example No. 1 of the present invention operates in the following manner as hereinafter described.

When the holder body 2 is placed at the in-service position as illustrated in FIG. 1, and when no container is accommodated or held in the accommodation space, the urging member 35 (see FIG. 2) urges the supporting member 3 to the retreated position, and the bottom urging member 250 (see FIGS. 3 and 4) urges the holder body 2's bottom 25 to the non-holding position. Then, when the holder body 2's bottom 25 is placed at the non-holding position, the movable switching unit 60 and fixed switching unit 61 of the switch 6 are separated greatly from each other as shown in FIG. 3. Thus, the switch 6 turns off the electric connection between the second actuating unit 41's coil 410 and electric power source 411.

When a user accommodates or holds a container in the accommodation space of the container holder according to Example No. 1 of the present invention as illustrated in FIG. 4, the container presses the bottom 25's bottom receiver 26 downward. Accordingly, the bottom 25 swings about the bottom swingably-supporting shaft 28 in the counterclockwise direction in FIG. 4, and then is placed at the holding position as shown in the drawing. In this instance, the movable switching unit 60, which is fastened to the bottom swingably-supporting shaft 28, swings about the bottom swingably-supporting shaft 28 as well in the counterclockwise direction in FIG. 4, and then approaches the fixed switching unit 61. When the movable switching unit 60, a magnet, approaches the fixed switching unit 61, a Hall-effect switch, outputs an electric current to turn on the electric connection between the coil 410 and electric power source 411 of the second actuating unit 41. Then, as can be seen from FIG. 8, the coil 410 produces an electromagnetic force when the coil 410 is connected electrically with the electric power source 411. Consequently, the coil 410 attracts the first actuating unit 40, a ferromagnet, in the clockwise direction as shown in FIG. 8.

Note that the first actuating unit 40 is fastened to the supporting member 3, and that the second actuating unit 41's coil 410 is fastened to the holder body 2. Accordingly, when the coil 410 attracts the first actuating unit 40 as illustrated in FIG. 5, the supporting member 3 swings against the urging member 35's urging force in the clockwise direction as designated in the drawing. Consequently, the accommodation space of the container holder according to Example No. 1 of the present invention diminishes diametrically. Specifically, the supporting member 3 swings to the supporting position, and stops swinging upon the arm 31 contacting with an outer peripheral surface of a container 8 as shown in FIG. 6. Therefore, the container holder according to Example No. 1 holds the container 8's bottom surface with the holder body 2's bottom 25, and supports the container 8's outer peripheral surface with the holder body 2's peripheral wall 240 and with the supporting member 3's arm 31. All in all, the container holder according to Example No. 1 can accommodate or hold the container 8 stably therein.

Moreover, when a user accommodates or holds the other container 8 with a smaller diameter in the accommodation space of the container holder according to Example No. 1 of the present invention as illustrated in FIG. 7, the supporting member 3 swings by a larger swing angle. Therefore, in this instance as well, the container holder according to Example No. 1 holds the smaller-diameter container 8's bottom surface with the holder body 2's bottom 25, and supports the smaller-diameter container 8's outer peripheral surface with the holder body 2's peripheral wall 240 and with the supporting member 3's arm 31. All in all, the container holder according to Example No. 1 can likewise accommodate or hold even the smaller-diameter container 8 stably therein.

Note that the container holder according to Example No. 1 of the present invention comprises the spacer 5. The spacer 5 is integrated with an outer periphery of the supporting member 3's swingable supporter 30, and is disposed on an opposite side with respect to the actuator 4's first actuating unit 40 with the second actuating unit 41's coil 410 interposed therebetween. Moreover, the spacer 5 is made from resin, one of paramagnets. Therefore, the electromagnetic force, which the coil 410 of the second actuating unit 41 produces, swings the supporting member 3 only in the clockwise direction as shown in FIG. 5, but does not at all swing the supporting member 3 in the counterclockwise direction in the drawing.

On the other hand, when a user removes the container 8 out of the accommodation space of the container holder according to Example No. 1 of the present invention, the bottom urging member 250's urging force swings the holder body 2's bottom 25 back to the non-holding portion. Then, the movable switching unit 60 of the switch 6 separates greatly from the fixed switching unit 61 of the switch 6 again. Accordingly, the switch 6 turns off the electric connection between the coil 410 and electric power source 411 of the second actuating unit 41. When the electric connection between the coil 410 and electric power source 411 of the second actuating unit 41 is turned off, the coil 410 loses the electromagnetic force. Consequently, as can be seen from FIG. 6, the urging member 35's urging force swings the supporting member 3 in the counterclockwise direction in the drawing to eventually place the supporting member 3 at the retreated position shown in FIG. 5.

In a case where the container holder according to Example No. 1 of the present invention does not accommodate or hold the container 8 in the accommodation space, that is, in a case where the supporting member 3 is placed at the retreated position as illustrated in FIG. 5, when a user slides the holder body 2 toward the casing 1, the supporting member 3's arm 31 is brought into contact with the casing 1's side wall. Then, when the user further slides the holder body 2 toward the casing 1 while keeping the supporting member 3's arm 31 contacting with the casing 1's side wall, the supporting member 3 swings against the urging member 35's urging force in the clockwise direction as designated in FIG. 5. Eventually, the supporting member 3 is placed at a position where it does not interfere with the casing 1's side wall, that is, at a supporting position. Accordingly, the container holder according to Example No. 1 can house the holder body 2 in the casing 1. In other words, a user can move the holder body 2 to an accommodated position. In this instance, note that the bottom urging member 250 urges the holder body 2's bottom 25 to the non-holding position as shown in FIG. 3. Consequently, when moving the holder body 2 to the accommodated position, the holder body 2's bottom 25 does not interfere with the casing 1 at all. Moreover, when a user slides the holder body 2 from the accommodated position to the in-service position, the urging member 35's urging force swings the supporting member 3 in the counterclockwise direction in FIG. 5. Finally, the supporting member 3 is placed at the retreated position as illustrated in FIG. 5.

As described above, the container holder according to Example No. 1 of the present invention holds the container 8's bottom surface with the holder body 2's bottom 25, and supports the container 8's outer peripheral surface with the holder body 2's peripheral wall 240 and with the supporting member 3's arm 31. Accordingly, the container holder according to Example No. 1 can accommodate or hold the container 8 stably therein. Moreover, the supporting member 3 can swing by variable swinging angles, which depend on the size of the container 8. Consequently, the container holder according to Example No. 1 can accommodate or hold not only the container 8 alone but also other containers with various sizes and shapes, which differ from those of the container 8, stably therein. In addition, the container holder according to Example No. 1 functions to swing the supporting member 3 by means of the electromagnetic force, which the second actuating unit 41's coil 410 produces. Therefore, it is not required at all to employ expensive devices, such as electric motors, to make the container holder according to Example No. 1. Namely, it is possible to manufacture the container holder according to Example No. 1 inexpensively.

The container holder according to Example No. 1 of the present invention functions to actuate the holder body 2's bottom 25 by means of the user's operations that he or she puts the container 8 into the accommodation space and removes the container 8 out of the accommodation space. Then, the bottom 25 operates to make the switch 6 turn on and turn off the electric connection between the second actuating unit 41's coil 410 and the electric power source 411. Accordingly, the container holder according to Example No. 1 can function to drive the supporting member 3 by means of the user's operations, such as putting the container 8 into the accommodation space and removing the container 8 out of the accommodation space. Consequently, the container holder according to Example No. 1 does not at all require the user troublesome operations for driving the supporting member 3.

In the container holder according to Example No. 1 of the present invention, the movable switching unit 60 of the switch 6 comprises a magnet, and the fixed switching unit 61 of the switch 6 comprises a Hall-effect switch. Accordingly, the switch 6 turns on the electric connection between the second actuating unit 41's coil 410 and the electric power source 411 when the movable switching unit 60 approaches the fixed switching unit 61. Consequently, it is not needed at all to dispose the movable switching unit 60 and fixed switching unit 61 of the switch 6 with high accuracy to each other. Thus, it is possible to furthermore reduce the manufacturing costs of container holders. It should be noted that, when the movable switching unit 60 comprises a Hall-effect switch, it is necessary to make the lead wires, which are connected with a Hall element of the Hall-effect switch, responsive to the movements of the movable switching element 60. However, in the container holder according to Example No. 1, it is possible to simplify the wiring of lead wires, because the fixed switching unit 61 comprises a Hall-effect switch.

In the container holder according to Example No. 1 of the present invention, the supporting member 3 swings to diametrically enlarge and diminish the accommodation space. Accordingly, it is possible to make the space required for disposing the supporting member 3 smaller. Moreover, in the container holder according to Example No. 1, the first actuating unit 40, the second actuating unit 41's coil 410 and the spacer 5 are disposed on an identical imaginary arc. Consequently, it is possible as well to make the spaces required for disposing the actuator 4, which comprises the first actuating unit 40 and the second actuating unit 41, and the spacer 5 smaller. Therefore, it is possible not only to downsize the container holder according to Example No. 1 but also to manufacture it at reduced manufacturing costs. All in all, the container holder according to Example No. 1 can be disposed appropriately in a limited on-board space, such as in an automobile passenger room, to use.

Moreover, the container holder according to Example No. 1 of the present invention comprises the spacer 5, which controls the swinging direction of the supporting member 3. Accordingly, the supporting member 3 can operate with enhanced reliability. Consequently, it is possible to reduce the manufacturing losses of the container holder according to Example No. 1, manufacturing losses, which might have resulted from the supporting member 3 operating faultily.

Example No. 2

Figure 9:
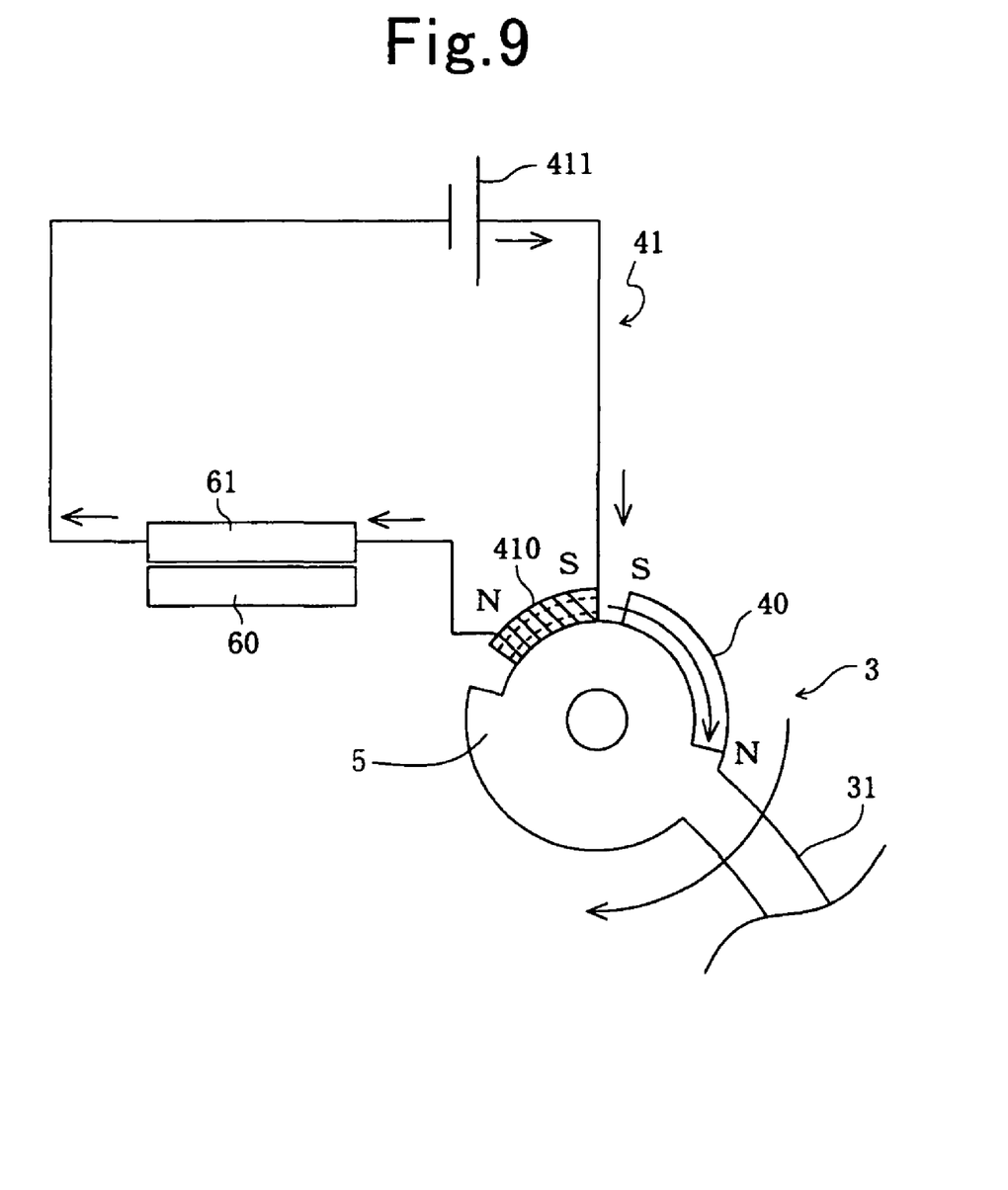
FIG. 9 is an explanatory diagram for schematically illustrating how a switch, an actuator, a supporting member and a spacer, which make a container holder according to Example No. 2 of the present invention, operate.
Figure 10:
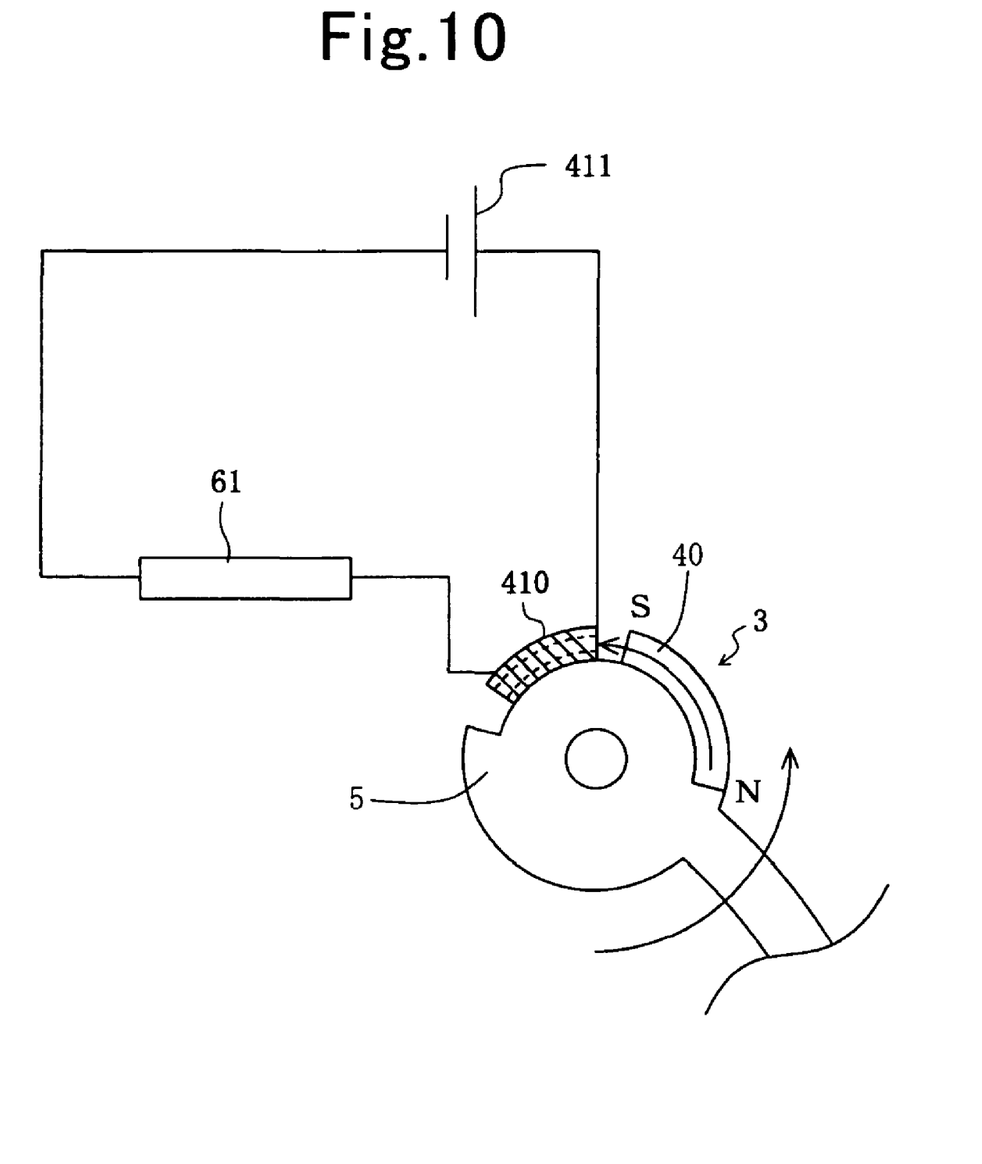
FIG. 10 is another explanatory diagram for schematically illustrating how the switch, the actuator, the supporting member and the spacer, which make the container holder according to Example No. 2, operate.

Except the following features, a container holder according to Example No. 2 of the present invention comprises the same component parts as those of the container holder according to Example No. 1. That is, the actuator 4's first actuating unit 40 is being magnetized. Moreover, the first actuating unit 40 is disposed at the location where the spacer 5 is disposed in the container holder according to Example No. 1. In addition, the spacer 5 is disposed at the location where the first actuating unit 40 is disposed in the container holder according to Example No. 1. FIGS. 9 and 10 schematically illustrate how the container holder according to Example No. 2 functions to operate the supporting member 3, the actuator 4, the spacer 5, and the switch 6.

In the container holder according to Example No. 2 of the present invention, the actuator 4's first actuating unit 40 comprises a magnet, a ferromagnet which is magnetized. The actuator 4's second actuating unit 41 comprises a coil 410, and an electric power source 411, similarly to the second actuating unit 41 of the container holder according to Example No. 1. As illustrated in FIG. 9, when the switch 6's movable switching unit 60 approaches the switch 6's fixed switching unit 61 to turn on the electric connection between the coil 410 and electric power source 411 of the second actuating unit 41, the coil 410 produces an electromagnetic force. In this instance, one of the opposite ends of the coil 410, which is connected with the positive electrode of the electric power source 410 turns into a south pole, and the other one of the opposite ends of the coil 410, which is connected with the negative electrode of the electric power source 410 turns into a north pole. Hereinafter, of the coil 410, the opposite end, which turns into a south pole when the coil 410 produces an electromagnetic force, will be referred to as a south-pole end; and the other opposite end, which turns into a north pole when the coil 410 produces an electromagnetic force, will be referred to as a north-pole end.

As illustrated in FIGS. 9 and 10, the first actuating unit 40 has a south pole, which faces to the south-pole end of the second actuating unit 41's coil 410. Accordingly, when the second actuating unit 41's coil 410 produces an electromagnetic force, the first actuating unit 40 repels to the electromagnetic force, which the coil 410 has produced. Consequently, the supporting member 3 swings in the clockwise direction as designated in FIG. 9. When the supporting member 3 thus swings in the clockwise direction in the drawing, the supporting member 3's arm 31 diminishes the accommodation space diametrically.

On the contrary, as illustrated in FIG. 10, when the switch 6's movable switching unit 60 gets away from the switch 6's fixed switching unit 61 to turn off the electric connection between the coil 410 and electric power source 411 of the second actuating unit 41, the coil 410 loses the electromagnetic force. Note that the coil 410 comprises a core, which is made of iron, a ferromagnet. Accordingly, the coil 410's core attracts the first actuating unit 40, a magnet. Consequently, the supporting member 3 swings in the counterclockwise direction as designated in FIG. 10. When the supporting member 3 thus swings in the counterclockwise direction in the drawing, the supporting member 3's arm 31 enlarges the accommodation space diametrically.

The container holder according Example No. 2 of the present invention is different from the container holder according to Example No. 1 in terms of the following features. That is, the container holder according Example No. 2 comprises the first actuating unit 40, which is made of a magnet, a ferromagnet being magnetized; and the first actuating unit 40 repels the second actuating unit 41's coil 410 to get away from the coil 410 when the coil 410 produces an electromagnetic force. However, the container holder according Example No. 2 also operates in the same manner as the container holder according to Example No. 1 operates so that the supporting member 3 can swing by variable rotary angles, which depend on the sizes of containers. Accordingly, regardless of the sizes and shapes of containers, the container holder according to Example No. 2 can similarly accommodate or hold containers with various sizes and shapes stably therein. Moreover, the container holder according Example No. 2 likewise functions to swing the supporting member 3 by means of the electromagnetic force, which the second actuating unit 41's coil 410 produces, in the same manner as the container holder according to Example No. 1 functions. Consequently, no expensive devices, such as electric motors, are required at all to make the container holder according to Example No. 2. Therefore, the container holder according to Example No. 2 can be manufactured inexpensively as well.

Note that the container holder according to Example No. 2 of the present invention can preferably further comprise a switching element, which switches the flowing direction of an electric current, which the second actuating unit 41's electric power source 410 supplies to flow in the second actuating unit 41's coil 410, from one direction to the other direction, or vice versa. In this preferable modification of the container holder according to Example No. 2, the switching element switches the flowing direction of an electric current, which the electric power source 410 supplies to flow in the coil 410, from a forward direction to a reverse direction, or vice versa, between the instance upon which the movable switching unit 60 approaches the fixed switching unit 61 and the instance upon which the movable switching unit 60 gets away from the fixed switching unit 61. For example, when the movable switching unit 60 approaches the fixed switching unit 61, the switching element allows the electric current to flow from one of the coil 410's opposite terminals, which is connected to the electric power source 410's positive electrode, to the other one of the coil 410's opposite terminals, which is connected to the electric power source 410's negative electrode; and then when the movable switching unit 60 gets away from the fixed switching unit 61, the switching element allows the electric current to flow in the opposite direction, that is, from the other one of the coil 410's opposite terminals, which is connected to the electric power source 410's negative electrode, to the one of the coil 410's opposite terminals, which is connected to the electric power source 410's positive electrode. Thus, the second actuating unit 41's coil 410 produces an electromagnetic force to repel (or attract) the first actuating unit 40 upon the movable switching unit 60 approaching the fixed switching unit 61. On the contrary, the second actuating unit 41's coil 410 produces an electromagnetic force to attract (or repel) the first actuating unit 40 upon the movable switching unit 60 getting away from the fixed switching unit 61. When the container holder according to Example No. 2 is thus configured preferably, it functions to enable the supporting member 3 to swing bidirectionally, that is, in the clockwise direction as well as in the counterclockwise direction, by means of the electromagnetic force, which the second actuating unit 41's coil 410 produces.

Having now fully described the present invention, it will be apparent to one of ordinary skill in the art that many changes and modifications can be made thereto without departing from the spirit or scope of the present invention as set forth herein including the appended claims.

What is claimed is:

1. A container holder, comprising:
   a holder body formed as a hollow shape which is opened upward, and demarcating at least a part of an accommodation space for accommodating or holding a container therein;
   a supporting member disposed movably to the holder body, at least a part of the supporting member coming in and coming out of the accommodation space of the holder body, thereby enlarging and diminishing the accommodation space diametrically;
   an actuator comprising a first actuating unit, which is made of a ferromagnet, and a second actuating unit, which is made of an electromagnet;
   a switch for turning on and turning off the second actuating unit of the actuator;
   one of the first actuating unit and second actuating unit of the actuator being fixed to the holder body, and the other one of the first actuating unit and second actuating unit of the actuator being fixed to the supporting member; and
   the second actuating unit of the actuator producing an electromagnetic force to move the first actuating unit of the actuator, thereby actuating the supporting member to diametrically diminish the accommodation space of the holder body.

2. The container holder according to claim 1, wherein:
   the holder body has a bottom disposed movably in an up/down direction, at least a part of the bottom disposed in the accommodation space of the holder body; and
   the switch has a movable switching unit fixed to the bottom of the holder body, and a fixed switching unit fixed to the holder body;
   wherein the bottom of the holder body moves downward to approach the movable switching unit of the switch the fixed switching unit of the switch, thereby actuating the switch to turn on the second actuating unit of the actuator; and
   the bottom moves upward to separate the movable switching unit of the switch from the fixed switching unit of the switch, thereby actuating the switch to turn off the second actuating unit of the actuator.

3. The container holder according to claim 2, wherein:
   one of the movable switching unit and fixed switching unit of the switch comprises a magnet; and
   the other one of the movable switching unit and fixed switching unit of the switch comprises a Hall-effect switch having a Hall element, the Hall-effect switch actuating the switch to turn on the second actuating unit of the actuator when the magnet approaches the Hall element.

4. The container holder according to claim 1 further comprising a spacer being fixed to one of the holder body and the supporting member, wherein:
   the supporting member has a swingable supporter disposed swingably to the holder body, and an arm, one of the opposite ends of the arm fixed to the swingable supporter and the other one of the opposite ends extending in a radial direction of the swingable supporter, and thereby the supporting member swings about the swingable supporter to diametrically enlarge and diminish the accommodation space of the holder body;
   the first actuating unit of the actuator is fixed to the supporting member;
   the second actuating unit of the actuator is fixed to the holder body, and has an electric power source and a coil, which make the electromagnet;
   the spacer is disposed on an opposite side with respect to the first actuating unit of the actuator with the coil of the second actuating unit of the actuator interposed therebetween; and
   the first actuating unit, the coil of the second actuating unit, and the spacer are disposed on an identical imaginary arc.

5. The container holder according to claim 4, wherein the spacer is made of a paramagnet.

* * * * *